US007731775B2

(12) United States Patent
Palmer et al.

(10) Patent No.: US 7,731,775 B2
(45) Date of Patent: Jun. 8, 2010

(54) SLOW-RELEASE (GSSP) FERTILIZER

(75) Inventors: Jay W. Palmer, Sun City Center, FL (US); Heidi Kay, Wesley Chapel, FL (US)

(73) Assignee: University of South Florida, Tampa, FL (US)

( * ) Notice: Subject to any disclaimer, the term of this patent is extended or adjusted under 35 U.S.C. 154(b) by 838 days.

(21) Appl. No.: 11/127,587

(22) Filed: May 12, 2005

(65) Prior Publication Data

US 2006/0010949 A1 Jan. 19, 2006

Related U.S. Application Data

(63) Continuation-in-part of application No. 10/313,497, filed on Dec. 6, 2002, now abandoned.

(60) Provisional application No. 60/337,924, filed on Dec. 6, 2001.

(51) Int. Cl.
*C05C 9/00* (2006.01)
(52) U.S. Cl. .................. 71/28; 71/29; 71/33; 71/48; 71/49; 71/53; 71/64.11
(58) Field of Classification Search .............. 71/29, 71/28, 33, 48, 49, 53, 64.11
See application file for complete search history.

(56) References Cited

U.S. PATENT DOCUMENTS

| | | | | |
|---|---|---|---|---|
| 2,867,522 A | * | 1/1959 | Facer | 71/37 |
| 2,976,119 A | * | 3/1961 | Manning et al. | 423/161 |
| 3,130,038 A | * | 4/1964 | Thomas et al. | 71/29 |
| 4,324,577 A | * | 4/1982 | Sepehri-Nik | 71/33 |
| 4,402,756 A | * | 9/1983 | Prine | 106/457 |
| 4,457,781 A | | 7/1984 | Palmer et al. | |
| 5,733,070 A | * | 3/1998 | Angell | 405/263 |
| 6,231,767 B1 | * | 5/2001 | Krofchak et al. | 210/697 |
| 6,287,358 B1 | * | 9/2001 | Mason et al. | 71/62 |
| 2003/0115920 A1 | * | 6/2003 | Palmer | 71/64.11 |

FOREIGN PATENT DOCUMENTS

| | | |
|---|---|---|
| GB | 890569 | 3/1962 |
| GB | 2050335 | 1/1981 |

OTHER PUBLICATIONS

"Essential Plant Nutrients", http://web.archive.org/web/20010819100732/http://soils.clemson.edu/elements.htm, Aug. 19, 2001.*

Hignett, The Use of Urea in Compound Fertilizers, Chemical Age of India, Nov. 1967, 18(11):800-809.
Hignett, New and Improved Fertilizer Materials based on Urea, Second Interregional Fertilizer Symposium, Sep. 21, 1971-Oct. 1, 1971 and Oct. 2, 1971-Oct. 12, 1971, 5-30.
Whittaker, Lundstrom, Hendricks, Reaction between urea and Gypsum, Industrial and Engineering Chemistry, Nov. 1933, 25(11):1280-1282.
Gupta, NP/NPK Fertilisers using Urea and Superphosphate, FAI-ISMA Seminar on Technology of Compound Fertilisers based on Urea, and Use and Benefication of Low Grade Phosphate Rock, Feb. 1976, I/2-1-I/2-8.
Hoek, Granulation of Urea Compound Fertilisers Within UKF/Stamicarbon, FAI-ISMA Seminar on Technology of Compound Fertilisers based on Urea, and Use and Benefication of Low Grade Phosphate Rock, Feb. 1976, 11/1-11/1-12.
Agarwal, NP/NPK Fertilisers through Nitrophosphate Route and its Prospects in India, FAI-ISMA Seminar on Technology of Compound Fertilisers based on Urea, and Use and Benefication of Low Grade Phosphate Rock, Feb. 1976, II/2-1.
Roy, TSP and Its Compound Fertiliser Production, FAI-ISMA Seminar on Technology of Compound Fertilisers based on Urea, and Use and Benefication of Low Grade Phosphate Rock, Feb. 1976, III/1-16-III/1-18.
Kuwabara, Hayamizu, Hatakeyama, Trends in Urea-Based Granular Compound Fertilizer Technology, Granular Fertilizers and their Production, 1977, pp. 125-147.
Foth, H.D., et al. "Soil pH Management" in Soil Fertility, $2^{nd}$ ed., Lewis Publishers, New York, NY, 1997, pp. 93-253.
Tan, Soils and the Environment, Environmental Soil Science, 2000, pp. 1-87.
Paton, T.R. "The Composition of the Lithosphere" in The formation of soil material, Boston MA, 1978, pp. 1- 45.
Troeh, Thompson, Soil Chemistry, Soils and Soil Fertility, 1993, pp. 129-147.
"Essential Plant Nutrients", http://web.archive.org/web/20010819100732/http://soils.clemson.edu/elements.htm, Aug. 19, 2001.
Moffat, A.S. "Engineering plants cope with metals" *Science*, 1999, vol. 285, pp. 369-370.

\* cited by examiner

*Primary Examiner*—Wayne Langel
(74) *Attorney, Agent, or Firm*—Saliwanchik, Lloyd & Saliwanchik

(57) ABSTRACT

Several compositions of matter have been discovered that can be used in the manufacture of slow-release fertilizers that contain all of the essential elements needed by plants and humans. Slow-release fertilizers manufactured with these formulations can be used on mineral stressed soils to increase the quality and production of food crops grown on them. Additives, including phosphogypsum, silica sand, natural gypsum, clay, and coal dust, facilitate the timing of the release of the essential elements into the soil.

21 Claims, No Drawings

SLOW-RELEASE (GSSP) FERTILIZER

CROSS-REFERENCE TO A RELATED APPLICATION

This application is a continuation-in-part of application U.S. Ser. No. 10/313,497, filed Dec. 6, 2002, abandoned, which claims priority from U.S. Ser. No. 60/337,924, filed Dec. 6, 2001, now abandoned, the disclosure of each of which is incorporated herein by reference in its entirety.

FIELD OF THE INVENTION

The subject invention pertains to the field of fertilizers, more particularly to the manufacture and use of slow-release fertilizers having essential elements necessary to promote growth on mineral stressed soils.

BACKGROUND OF THE INVENTION

On Oct. 12, 1999, the world population reached six billion (Wright, 1999). At the turn of the twenty-first century the estimated population was 6.1 billion. With such a dramatic increase in population, it is obvious that there is an ever increasing need to feed the world's population.

Because only 11% of the world's soils are fertile enough to be farmed without serious limitation, intense pressure is placed on using less fertile soils. Drought is a major problem for approximately 28% of the land; mineral stress is a problem for an additional 23%. Most soils affected by drought are alkaline, whereas most affected by mineral stress are acidic (Foth and Ellis, 1997).

While fertility of deficient soils can be improved utilizing fertilizers containing appropriate amounts of essential elements for plant growth, these fertilizers may not contain the essential elements required by humans. This is especially true for crops grown upon acidic soils such as: lateritic, heavily-leached soils found throughout much of the tropical world (Moffat, 2000); silica-sand soils of Africa and Florida (Tan, 1998); young igneous soils containing larger fragments of unreactive feldspars and quartz, found in Zimbabwe and Zambia (Paton, 1978); and moderately acidic soils such as those in southeastern United States and many other parts of the world (Foth and Ellis, 1997). Thus, there is a need for fertilizers that contain essential elements required by both plants and humans to provide human populations with good physical and mental health.

Attempts to prepare such fertilizers have met with mixed results. Commercially available fertilizers are usually formulated by blending a mixture of various chemical compounds, which are not necessarily compatible. For example, the 12-12-12 microelements fertilizer, used on many illitic clay-loam soils, is one of the best commercial fertilizers on the market today. It consists of a granulated mixture of ammonium nitrate, urea, ammonium sulfate, and sulfuric acid blended with granular monocalcium/dicalcium phosphate (GTSP), granular potassium chloride, and granulated micro and trace elements. These are all essential nutrients needed to sustain healthy plant life (Foth and Ellis, 1997). After blending, fertilizer chemicals such as ureas can displace the hydrate water contained in the monocalcium/dicalcium phosphate compounds (Whittaker et al., 1933) yielding a sticky or soupy mess. Further, microelements such as iron can be readily oxidized to the plus three state ($Fe^{3+}$) and react with phosphate anions ($PO_4^-$) to form an insoluble, unavailable ferric phosphate.

Even after application, many micro and trace element granules are so widely spaced that many plants cannot get all essential elements required for growth. Furthermore, bacterial action can result in 30% or more of the nitrogen value being lost to the atmosphere as nitrogen and nitrous oxide gases (Foth and Ellis, 1997). Finally, summer rains can wash soluble salts into aquifers, streams and lakes. Therefore, improvements need to be made to reduce the rate of release of nitrogen compounds and other essential elements to the soil.

In the late seventies, a slow-release fertilizer was developed by acidulating a high-assay phosphatic clay slime with sulfuric acid, then adding the micro and trace elements followed by formaldehyde, potassium chloride, and urea. This product worked well as a fertilizer, but was somewhat expensive and too slow in releasing essential elements.

In the late eighties, another slow-release fertilizer was developed for use in regions abundant in chicken populations. The initial mixture contained: ground chicken bones; viscera; ground phosphate ore; and sulfuric acid in which chopped chicken feathers had been dissolved. Micro and trace essential elements, potassium chloride, and urea or ammonium nitrate were added. This product was an adequate fertilizer, but limited in its application.

Thus there is a continuing need for improvements to slow-release fertilizers containing essential elements.

All references cited herein are incorporated by reference in their entirety, to the extent not inconsistent with the explicit teachings set forth herein.

BRIEF SUMMARY OF THE INVENTION

The present invention relates to the improvement of slow-release fertilizers. This improvement utilizes dolomitic phosphatic clay slime to inhibit the precipitation of insoluble micro and trace essential elemental phosphates. In one specific embodiment, the improvement further utilizes an additive for breaking down the fertilizer granules. Additives useful for this embodiment include, without limitation, phosphogypsum, silica sand, natural gypsum, clay, fine coal dust, or combinations of any of the foregoing. Advantageously, the additive facilitates the removal of the trace essential elements from the fertilizer. The water contained in the slime disproportionates most of the monocalcium phosphate produced in the manufacture to the more insoluble dicalcium phosphate. In addition, it utilizes urea as a coordinating ligand to form complex chains with calcium and magnesium. The process is followed by heat for granulation. Therefore, there is no residual water post-granulation to create the sticky, soupy by-product resulting from the production of other urea containing fertilizers.

The resulting slow-release fertilizer contains all essential elements needed by plants and humans, with the exception of carbon, iodine (found in table salt), or the more toxic essential elements such as arsenic, lead, and cadmium (Stanitski et al., 2000).

Accordingly, the present invention provides an enhanced fertilizer.

The present invention also provides an enhanced slow-release fertilizer.

The present invention provides an enhanced slow-release fertilizer containing essential elements.

The present invention provides methods for making enhanced slow-release fertilizers containing essential elements for use in mineral stressed soils.

The present invention also provides methods for using dolomitic phosphate ores.

Further advantages of the present invention will become apparent by reference to the following detailed disclosure of the invention and appended drawings.

DETAILED DESCRIPTION OF THE INVENTION

Materials suitable as a base and fertilizer can be provided to prepare a fertilizer of the present invention. For example, four phosphate ore samples are useful for preparing slow-release fertilizers according to the present invention. Two of the ores are dolomitic and obtained from C.F. Industries' (CFI) Hardee County, FL mine—of the two, sample one contains 0.5% MgO, and sample two contains 2% MgO. These ores are hand-ground into two fractions—a minus 70 mesh (−212 micron) plus 140 mesh (+106 micron) and a minus 140 mesh (−106 micron). Sample three is an ore (phos rock) obtained from Texas Gulf Sulfur's (TGS) Polk County, FL mine and is generally used in manufacturing commercial fertilizers. Sample three is ground to a minus 35/60 Tyler mesh size (about −400+200 micron). Sample four is an igneous phosphate ore obtained from Zimbabwe Phosphate Industries Ltd.'s Dorowa mine in Harara, Zimbabwe. It analyzes at 35.5% $P_2O_5$; 1.9% $Fe_2O_3$; 48.1% CaO; 0.8% MgO; 0.6% $K_2O$; 0.5% $Na_2O$; and 2% $CO_2$. It is ground to minus 140 mesh (−106 micron) size, generally used for making commercial granular triple super phosphate (GTSP) fertilizers. The use of finely ground ores in the manufacturing process reduces the reaction times.

According to the subject invention, four stages are used in the preparation and evaluation of slow-release fertilizers, the processing conditions of which are illustrated in Table 1. The first stage consists of measuring out a sufficient amount of 95.5% sulfuric acid ($H_2SO_4$) to react with the phosphate ore, and combining it with water to yield a $H_2SO_4$ concentration at about 40%-90%. (In experiment 23 C, 85.2% phosphoric acid was used.) The coarse fraction of ground ore in the CFI ores (samples one and two) and the commercial ore sizes in the TGS (sample three) and Dorowa ores (sample four) are added. The mixture is stirred with a glass rod during the reaction while the temperature rises to a maximum of around 110°-120° C.; when the reaction is complete, the temperature decreases. In approximately 20 minutes a partially dried mass is formed. At this stage, a portion of the phosphate ore has been converted to monocalcium phosphate (Ca $H_2PO_4.H_2O$); gypsum ($CaSO_4.2H_2O$); and in the case of CFI and Dorowa ores, magnesium sulfate ($MgSO_4.6H_2O$) also forms.

At the second stage, micro and trace essential elements are dispersed in the slime (see Table 1). The partially dried mass is mixed with differing amounts of the CFI dolomitic phosphatic clay slime combination (approximately 5-20% solids, preferably 11%) and heated to around 80° C. for various times. The monocalcium phosphate disproportionates into dicalcium phosphate ($CaHPO_4.2H_2O$) and phosphoric acid. The phosphoric acid reacts with remaining unreacted phosphate ore until equilibrium is achieved. At equilibrium, a small amount of finely ground phosphate is added to neutralize the residual phosphoric acid. At this point, the clay (magnesium/calcium montmorillonite) platelets form a "house of cards" structure in which a variety of salts occupy the small compartments.

At the third stage, a mixture of urea ($H_2NCONH_2$) and potassium chloride (KCl) is added to the partially dried compartmentalized mass (see Table 1). Urea reacts with the salts that occupy the small compartments to release water and forming thin slurries. The temperature is held to between about 80° to 90° C. until most of the water is removed by evaporation. The calcium and magnesium ions coordinate with one sulfate or hydrogen phosphate ion and two urea bidentate ligand molecules. The potassium ions bind between two montmorillonite platelets. The compartmentalized mass is dried further at about 110° C. as it is granulated by mechanical means. It is important not to exceed 110° C. during the final granulation. The final pH is approximately 7.0 due to the neutralizing effect of the urea. The composition of each experimental fertilizer is provided in Table II.

The fourth stage tests fertilizer resistance. Fertilizer size granules are placed in petri dishes and tested for physical and chemical breakdown as they are subjected to conditions similar to that during use such as rainfall (see Table III). Some samples disintegrate in just a few days while others still have some granular integrity at twenty weeks. A few samples were analyzed for type of phosphate by Thornton Laboratories, Inc., Tampa. These results and the stoichiometry of each fertilizer composition are shown in Table II.

Inspection of the data shown in the three tables indicates that a 10-13-10(10% N, 13% $P_2O_5$, 10% $K_2O$) fertilizer composition is readily obtained (see Ex. 13) that contains over 12% calcium, 8% sulfur, almost 8% chlorine, 0.5% magnesium and the following essential elements: 1% Fe; 1% Zn; 0.03% Mn; 0.01% Cr; 0.01% Co; 0.01% B; 0.01% Mo; 0.001% Ni; 0.001% Sn; 0.001% V; and 0.001% Se. Most of the phosphate is in the available form. Some granules of this composition last over twenty weeks with daily wetting and drying cycles before completely disintegrating. Both granular single super phosphate (GSSP), see 23B, and granular triple super phosphate (GTSP) see 23C, experimental test samples had disintegrated extensively within a few hours.

Granules appear to require phosphatic clay slime, urea bidentate ligands, and some magnesium ions to have the longest survival time. The phosphatic clay slime prevents transition metal ions such as iron from precipitating as iron (III) phosphate. Experiment 23A has a strong red color indicating that without phosphatic clay slime being present, iron (III) phosphate does precipitate. Its solubility may be so low that it may not be available to plant life in the fertilizer. The significance of magnesium ions was unexpected. Smaller magnesium ions hold the urea ligand more tightly than does the calcium ion. This enables linkages to form between magnesium and calcium ions via the bidentate urea ligands, thereby forming chains throughout each compartment made by the clay slime montmorillonite platelets. Those having no urea (Ex. 12), little or no magnesium (Ex. 18) have short lifetimes, while those without clay slime form phosphate precipitates with some of the essential micro and trace elements (see Ex. 23A).

It is well known (Whittaker et al, 1933) that gypsum and urea react in water at 30° C. to form complexes. Since a maximum of four urea bidentate molecules can form a complex with calcium, the probable complex shape is cubic. However, when dried at 110° C. the ions appear to link together for form hexagonal complexes containing only one bidentate urea molecule and one bidentate hydrogen sulfate ion and/or one bidentate hydrogen phosphate ion as cross-linking ligands. The use of the smaller magnesium ion, also complexed with these ligands in the linkage, makes the chains stronger and more resistant to attack by water molecules.

During the hot acid attack, magnesium and calcium ions contained between the montmorillonite platelets are displaced by hydrogen ions. When potassium chloride is added, the potassium ions displace the hydrogen ions to form weak micaceous structures. There is some competition with a number of the minor and trace element ions; however, the potassium ions fit in better. Therefore, most of the essential elements are tied up in the compartmentalized structure as complex ions and are released at a lower rate.

One specific embodiment of the present invention is directed to incorporating at least additive to the fertilizer during its final granulation. The additive can be selected from any ground solid particle capable of breaking down the subject fertilizers. A preferred particle size for the additive is between about 100 micron and about 300 micron. The skilled artisan can select additive to target nutrient release during the growing season of the fertilized plant. Examples of suitable additives include, without limitation, phosphogypsum, natural gypsum, silica sand, clay, and coal dust. In one embodiment, the additives are combinations of any of the foregoing. The fineness of the additives affects the break down of the fertilizer granules. As the additives become more fine, the fertilizer granules will tend to break down quicker and to release the essential elements into the surrounding soil and plant roots.

The additives are incorporated into the fertilizers prepared according to the subject invention until the weight percent of the additives is about 2% to about 5%. In specific embodiments, the weight percent of the additives in the subject fertilizers is about 2%, about 2.1%, about 2.2%, about 2.3%, about 2.4%, about 2.5%, about 2.6%, about 2.7%, about 2.8%, about 2.9%, about 3%, about 3.1%, about 3.2%, about 3.3%, about 3.4%, about 3.5%, about 3.6%, about 3.7%, about 3.8%, about 3.9%, about 4%, about 4.1%, about 4.2%, about 4.3%, about 4.4%, about 4.5%, about 4.6%, about 4.7%, about 4.8%, about 4.9%, or about 5%. In one embodiment, the fertilizer is prepared from 0.5% MgO ore. In another embodiment, the fertilizer is prepared from 2.0% MgO ore. Advantageously, the additives can be incorporated into the fertilizers named in Tables I, II, and III in the weight percentages disclosed above.

In one embodiment, a high quality silica sand is the additive, and the sand is obtained from a silica deposit that yields products of at least 95% $SiO_2$.

The additive enhanced fertilizers of the present invention may optionally be applied to the soil only once per growing season or applied multiple times. Optionally, the additive enhanced fertilizers can be applied to the leaves and stems of the plants.

As used in this specification and the appended claims, the singular forms "a", "an", and "the" include plural reference unless the context clearly dictates otherwise. Thus, for example, a reference to "a plant" includes more than one such plant.

The terms "comprising", "consisting of", and "consisting essentially of" are defined according to their standard meaning and may be substituted for one another throughout the instant application in order to attach the specific meaning associated with each term.

The term "dolomitic phosphatic clay slime" also refers to montmorillonite clay slime. They may be substituted for another throughout the instant application.

The term "phosphogypsum" refers to gypsum (i.e., calcium sulfate) that is the by-product of phosphoric acid production.

The term "silica sand" is interchangeable with the term "industrial sand" and refers to high quality quartz ($SiO_2$). Silica sand is deposited by natural processes and exhibits a crystalline structure.

The term "natural gypsum" is interchangeable with the term "gypsum" and refers to naturally forming hydrated calcium sulfate [$CaSO_4 \cdot 2(H_2O)$].

Following are examples which illustrate procedures for practicing the invention. These examples should not be construed as limiting. All percentages are by weight and all solvent mixture proportions are by volume unless otherwise noted.

EXAMPLE 1

In a preferred embodiment, the following steps are performed:

Step 1

40%-90% (preferably 70%) sulfuric acid ($H_2SO_4$) is reacted with dolomitic phosphate to yield a mixture containing 34-41% $H_2SO_4$ and 59-66% dolomitic phosphate. The mixture is heated at about 100°-130° C. for approximately 15-30 minutes to form water soluble monocalcium phosphate $Ca(H_2PO_4)_2 \cdot H_2O$ and $CaSO_4 \cdot 2H_2O$ a) 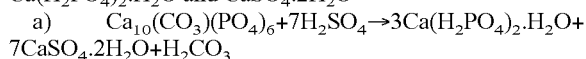

b) 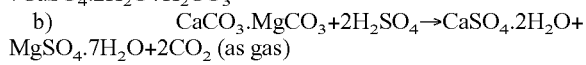

Step 2

Dolomitic phosphatic clay slime (approximately 5-20%, preferably 11% solids) is mixed with 0.05% Fe, 0.02% Zn, 0.001% Cu, 0.0002% Mn, 0.0002% Se, 0.0001% B, 0.0001% Cr, 0.0001% Co, and 0.0001% Mo and added to yield a mixture containing 35-55% (dolomitic phosphatic clay slime mixture) and 45-65% (monocalcium phosphate mixture). The mixture is heated for 30-90 minutes at about 70° C.-100° C. The water in the slime disproportionates the $Ca(H_2PO_4)_2 \cdot H_2O$ to $CaHPO_4 \cdot 2H_2O$ and phosphoric acid ($H_3PO_4$). The $H_3PO_4$ dissolves additional phosphate ore, and reacts with the dolomitic phosphatic clay slime binding the soluble essential elements to the clay platlets. In addition, the $H_3PO_4$ reacts with aluminum at the periphery of the clay platlets linking them together.

Step 3

Enough finely divided dolomitic phosphate ore is added at about 70° C. to 100° C. to partially neutralize the $H_3PO_4$ and bring the pH to about 3-6.

Step 4

Finally, KCl and urea are added to yield a mixture containing 2-12% KCl and 8-15% urea. Urea raises the pH and displaces hydrate water from biproduct gypsum ($CaSO_4 \cdot 2H_2O$), dicalcium phosphate ($CaHPO_4 \cdot 2H_2O$), and monocalcium phosphate ($Ca(H_2PO_4)_2 \cdot H_2O$). Because urea is a bidentate amine ligand, it coordinates any free transition essential element ions, calcium ions, and magnesium ions binding them together. The mixture is heated to between 100°-120° C., thereby driving off the water and granulating the remaining mixture into hard granules for application. The resulting granules release the essential elements slowly as moisture is added. As a result, most of the essential elements remain in the soil and loss of essential elements to rain water runoff is thereby reduced.

EXAMPLE 2

Four rows were planted with ten plants of tomatoes per row. The tomato variety was Florida 47. The plants were spaced two feet apart, and each of the rows were spaced five feet apart.

Different fertilizers, including specific embodiments of the present invention, were applied to the soil surrounding the tomato plants and a top the tomato plants. The fertilizer was applied to completely surround the tomato plants.

One fertilizer was a 10-10-10 fertilizer with no added nutrients. A second fertilizer was prepared from 2.0% MgO ore. A third fertilizer was prepared from 0.5% MgO ore.

Tomato plants fertilized with the above were compared (average tomato yield per plant) to tomato plants fertilized with a 10-10-10 fertilizer prepared from 2.0% MgO ore and the additive phosphogypsum. The specific embodiments included a fertilizer prepared with a dolomite clay slime and a fertilizer prepared with a dolomite clay slime and phosphogypsum. Each plant was fertilized only at the time of planting; each plant was watered daily with a soker hose.

The tomatoes grew to a height of approximately two feet, regardless of the type of fertilizer. The tomato plants fertilized with the fertilizers of the invention were not attacked by insects nor did fungus grow at the juncture between the stem and the fruit. These tomatoes' diameters were approximately within the range of 3-4 inches. The yield is given in Table IV.

Inasmuch as the preceding disclosure presents the best mode devised by the inventor for practicing the invention and is intended to enable one skilled in the pertinent art to carry it out, it is apparent that methods incorporating modifications and variations will be obvious to those skilled in the art. As such, it should not be construed to be limited thereby but should include such aforementioned obvious variations and be limited only by the spirit and purview of this application.

TABLE I

Processing Conditions

| Ex. No. VI-JP | Type Ore | Size μm | Amt g | $H_2SO_4$ %* | Amt g | Temp °C. | Time min | Type clay** |
|---|---|---|---|---|---|---|---|---|
| 3 | CFI, 0.5 | −212 | 18.0 | 95.5 | 7.2 | 120 | 20 | P. clay slime |
| 4 | CFI, 0.5 | −212 | 18.0 | 95.5 | 7.2 | 120 | 20 | P. clay slime |
| 5 | CFI, 0.5 | −212 | 18.0 | 95.5 | 7.2 | 120 | 20 | P. clay slime |
| 6 | CFI, 0.5 | −212 | 18.0 | 95.5 | 7.2 | 120 | 20 | P. clay slime |
| 7 | CFI, 2.0 | −212 | 18.0 | 95.5 | 7.2 | 120 | 20 | P. clay slime |
| 8 | CFI, 0.5 | −212 | 18.0 | 95.5 | 7.2 | 120 | 20 | P. clay slime |
| 9 | CFI, 0.5 | −212 | 18.0 | 95.5 | 7.2 | 120 | 20 | P. clay slime |
| 10 | CFI, 0.5 | −212 | 18.0 | 95.5 | 10.0 | 120 | 20 | P. clay slime |
| 11 | CFI, 0.5 | −212 | 18.0 | 95.5 | 14.0 | 120 | 20 | P. clay slime |
| 12 | CFI, 0.5 | −212 | 18.0 | 95.5 | 10.0 | 120 | 100 | P. clay slime |
| 13 | CFI, 0.5 | −212 | 18.0 | 95.5 | 11.0 | 120 | 20 | P. clay slime |
| 14 | CFI, 2.0 | −212 | 18.0 | 95.5 | 11.0 | 120 | 20 | P. clay slime |
| 15 | CFI, 2.0 | −212 | 18.0 | 95.5 | 11.0 | 120 | 20 | P. clay slime |
| 16 | CFI, 2.0 | −212 | 18.0 | 95.5 | 11.0 | 120 | 20 | P. clay slime |
| 17 | CFI, 0.5 | −212 | 18.0 | 95.5 | 11.0 | 120 | 20 | P. clay slime |
| 18 | TGS | −420/+200 | 18.0 | 95.5 | 11.0 | 120 | 20 | P. clay slime |
| 19 | DOR, ZIM | −106 | 18.0 | 95.5 | 11.0 | 120 | 20 | P. clay slime |
| 20 | CFI, 0.5 | −212 | 18.0 | 95.5 | 11.0 | 120 | 20 | P. clay slime |
| 21 | CFI, 0.5 | −212 | 18.0 | 95.5 | 11.0 | 120 | 20 | P. clay slime |
| 22 | CFI, 0.5 | −212 | 18.0 | 95.5 | 11.0 | 120 | 20 | P. clay slime |
| 23A | CFI, 2.0 | −212 | 18.0 | 95.5 | 11.0 | 120 | 20 | water |
| 23B | CFI, 2.0 | −212 | 18.0 | 95.5 | 11.0 | 120 | 20 | water |
| 23C | CFI, 2.0 | −212 | 18.0 | $H_3PO_4$, 85.2% | 11.3 | 120 | 20 | water |

| Ex. No. VI-JP | Amt g | Temp °C. | Time min | Type urea/KCl | Amt g/g | Temp °C. | Time min | Final Wt g |
|---|---|---|---|---|---|---|---|---|
| 3 | 10 | 80 | 10 | gran/gran | 6.0/6.0 | 80/100 | 120 | 34.4 |
| 4 | 10 | 80 | 10 | gran/gran | 7.0/6.0 | 80/120 | 120 | 36.3 |
| 5 | 10 | 80 | 10 | gran/gran | 9.8/2.4 | 80/120 | 120 | 34.2 |
| 6 | 10 | 80 | 10 | gran/gran | 12.0/6.0 | 90/120 | 120 | 39.7 |
| 7 | 10 | 80 | 10 | gran/gran | 5.9/4.0 | 85/105 | 120 | 33.5 |
| 8 | 10 | 80 | 10 | gran/gran | 5.9/4.3 | 80/110 | 120 | 33.9 |
| 9 | 10 | 80 | 10 | gran/gran | 7.4/5.3 | 80/110 | 120 | 35.3 |
| 10 | 10 | 80 | 10 | gran/gran | 8.0/5.3 | 80/110 | 120 | 37.0 |
| 11 | 10 | 80 | 90 | none/none | 8.8/6.3 | 80/110 | 120 | 42.6 |
| 12 | 10 | 80 | 60 | gran/gran | 0/0 | 80/110 | 120 | 25.8 |
| 13 | 20 | 80 | 35 | gran/gran | 9.0/6.5 | 80/110 | 120 | 41.1 |
| 14 | 20 | 80 | 35 | gran/gran | 11.0/5.2 | 80/110 | 120 | 45.2 |
| 15 | 20 | 80 | 60 | gran/gran | 10.0/3.4 | 80/110 | 120 | 43.6 |
| 16 | 30 | 80 | 60 | gran/gran | 10.0/3.4 | 80/110 | 120 | 44.4 |
| 17 | 30 | 80 | 60 | gran/gran | 10.0/3.4 | 90/120 | 120 | 44.5 |
| 18 | 30 | 80 | 45 | gran/gran | 10.0/3.4 | 80/110 | 120 | 44.0 |
| 19 | 30 | 80 | 60 | gran/gran | 10.0/3.4 | 90/110 | 120 | 44.1 |
| 20 | 30 | 80 | 60 | gran/gran | 10.0/3.4 | 90/110 | 120 | 43.5 |
| 21 | 30 | 80 | 60 | gran/gran | 10.0/3.4 | 90/110 | 120 | 45.1 |
| 22 | 30 | 80 | 60 | gran/gran | 10.0/3.4 | 90/110 | 120 | 44.9 |
| 23A | 10 | 80 | 60 | gran/gran | 10.0/3.4 | 90/110 | 120 | 39.2 |
| 23B | 10 | 80 | 60 | none | xxxxxxx | xxxxxx | xxxx | 26.3 |
| 23C | 10 | 80 | 60 | none | xxxxxxx | xxxxxx | xxxx | 26.1 |

*4.0 $H_2O$ g also added to $H_2SO_4$
**Dolomitic-phosphate montmorillonite clay slime (11% solids) containing micro-elements Fe, Zn and trace elements Cu, Mn, Se, Cr, Mo, B, Sn, V, Si

TABLE II

PRODUCT COMPOSITION (%)

| Ex. No. VI-JP | Total P$_2$O$_5$ | Water Sol P$_2$O$_5$ | Citrate Sol P$_2$O$_5$ | Avail P$_2$O$_5$ | N2 | K$_2$O | Ca | S | Mg | Cl |
|---|---|---|---|---|---|---|---|---|---|---|
| 03 | 14.4 | 1.3 | 6.5 | 7.8 | 8.1 | 11.2 | 6-8 | 6.4 | 0.5 | 8.0 |
| 04 | 15.2 | 0.5 | 7.0 | 7.6 | 9.1 | 10.8 | 6-8 | 6.4 | 0.5 | 7.6 |
| 05 | 14.6 | 0.8 | 7.9 | 8.7 | 14.1 | 4.1 | 6-8 | 6.4 | 0.5 | 3.0 |
| 06 | 13.9 | 0.6 | 5.8 | 6.4 | 14.0 | 9.7 | 6-8 | 6.4 | 0.5 | 7.0 |
| 07 | | | | ~7 | 8.1 | 6.2 | 6-8 | 6.4 | 1.0 | 4.5 |
| 08 | | | | ~7 | 8.1 | 6.3 | 6-8 | 6.4 | 0.5 | 4.5 |
| 09 | | | | ~7 | 9.7 | 5.2 | 6-8 | 6.4 | 0.5 | 4.0 |
| 10 | 13.2 | 3.1 | 6.5 | 9.5 | 10.1 | 5.3 | 14 | 8.2 | 0.5 | 4.0 |
| 11 | 12.3 | 2.1 | 7.6 | 9.6 | 10 | 10 | 13 | 8.2 | 0.5 | ~8 |
| 12 | | | | 2.0 | 0 | 0 | 19 | 13.0 | 0.5 | <0.5% |
| 13 | 13.3 | 1.7 | 11.5 | 13.1 | 10.2 | 10.0 | 17 | 8.2 | 0.5 | 7.7 |
| 14 | | | | 13.1 | 10.2 | 6.1 | | 8.2 | 1.0 | ~5 |
| 15 | | | | 13.1 | 9.0 | 4.9 | | 8.2 | 1.0 | ~4 |
| 16 | | | | 13.1 | 11.3 | 5.2 | 17 | 8.0 | 1.0 | 4.0 |
| 17 | | | | 13.1 | 11.3 | 5.2 | 17 | 8.0 | 0.5 | 4.0 |
| 18 | | | | 13.1 | 11.3 | 5.2 | 17 | 8.0 | 0.5 | 4.0 |
| 19 | | | | 13.1 | 11.3 | 5.2 | 17 | 8.0 | 0.5 | 4.0 |
| 20 | | | | 13.1 | 11.3 | 5.2 | 17 | 8.0 | 0.5 | 4.0 |
| 21 | | | | 13.1 | 11.3 | 5.2 | 17 | 8.0 | 0.5 | 4.0 |
| 22 | | | | 13.1 | 11.3 | 5.2 | 17 | 8.0 | 0.5 | 4.0 |
| 23A | | | | ~14 | 11.3 | 5.2 | 17 | 8.0 | 0.5 | 4.0 |
| 23B | | | | ~19 | 0 | 0 | 27 | ~12 | ~7.5 | 0 |
| 23C | | | | ? | 0 | 0 | 27 | — | ~7.5 | 0 |

TABLE III

DEGRATION OF FERTILIZER GRANULES*

| Exp. No. VI-JP | Granule Firmness | One Week | Two Weeks | Four Weeks | Six Weeks | Eight Weeks | Ten Weeks | Twelve Weeks | Sixteen Weeks | Twenty Weeks | Comments |
|---|---|---|---|---|---|---|---|---|---|---|---|
| 03 | Firm | Sl.d. | Sl.d. | Sl.d. | Mod.d. | Mod.d. | Mod.d. | Mod.d. | Ext.d. | Ext.d. | Contains unreacted ore |
| 04 | Soft | Mod.d. | Mod.d. | Ext.d. | Com.d. | | | | | | |
| 05 | Soft | Mod.d. | Mod.d. | Com.d. | | | | | | | |
| 06 | Soft | Mod.d. | Mod.d. | Com.d. | | | | | | | |
| 07 | Firm | Mod.d. | Mod.d. | Mod.d. | Mod.d. | Mod.d. | Mod.d. | Mod.d. | Mod.d. | Mod.d. | Contains unreacted ore |
| 08 | Soft | Mod.d. | Mod.d. | Mod.d. | Ext.d. | Com.d. | | | | | |
| 09 | Firm | Mod.d. | Mod.d. | Mod.d. | Ext.d. | Ext.d. | Ext.d. | Ext.d. | Ext.d. | Ext.d. | Contains unreacted ore |
| 10 | Firm | Ext.d. | Ext.d. | Ext.d. | Ext.d. | Ext.d. | Ext.d. | Com.d. | | | |
| 11 | Soft | Mod.d. | Mod.d. | Mod.d. | Ext.d. | Ext.d. | Ext.d. | Com.d. | | | |
| 12 | V. Soft | Ext.d. | Com.d. | | | | | | | | |
| 13 | Firm | Sl.d. | Sl.d. | Mod.d. | Mod.d. | Ext.d. | Ext.d. | Ext.d. | Ext.d. | Ext.d. | |
| 14 | Firm | | | Ext.d. | Ext.d. | Com.d. | | | | | |
| 15 | Firm | | | Ext.d. | Ext.d. | Com.d. | | | | | |
| 16 | Firm | | | Ext.d. | Ext.d. | Com.d. | | | | | |
| 17 | Firm | | Ext.d. | Ext.d. | Ext.d. | Ext.d. | Ext.d. | Com.d. | | | |
| 18 | Soft | | Ext.d. | Ext.d. | Ext.d. | Ext.d. | Ext.d. | Ext.d. | | | |
| 19 | Firm | | Mod.d. | Mod.d. | Mod.d. | Mod.d. | Mod.d. | Mod.d. | | | |
| 20 | Firm | | Mod.d. | Ext.d. | Ext.d. | Ext.d. | Ext.d. | Ext.d. | | | |
| 21 | Firm | | Mod.d. | Ext.d. | Com.d. | | | | | | |
| 22 | Soft | | Ext.d. | Ext.d. | Ext.d. | Ext.d. | Ext.d. | Ext.d. | | | |
| 23A | Firm | Sl.d. | Mod.d. | Mod.d. | Mod.d. | Mod.d. | Mod.d. | Mod.d. | | | |
| 23B | Soft | Com.d. | | | | | | | | | |
| 23C | Soft | Com.d. | | | | | | | | | |

TABLE IV

COMPARISON OF A 10-10-10 MICRO ELEMENTS FERTILIZER WITH THREE DIFFERENT SLOW-RELEASE FERTILIZERS

| | Type Fertilizer | Average Yield Tomatos/Plant |
|---|---|---|
| Row 1B | Commercial Ferilizer | 2.4 |
| Row 3A | 10-10-10 fertilizer prepared with 2.0% MgO (VI-JP14) | 4.0 |
| Row 3B | 10-10-10 fertilizer prepared with 0.5% MgO and 13% calcium (VI-JP13) | 4.5 |

TABLE IV-continued

COMPARISON OF A 10-10-10 MICRO ELEMENTS FERTILIZER WITH THREE DIFFERENT SLOW-RELEASE FERTILIZERS

| | Type Fertilizer | Average Yield Tomatos/Plant |
|---|---|---|
| Row 4B | 10-10-10 fertilizer prepared with 2.0% MgO and 5%, ground phosphogypsum added during final granulation | 7.2 |

REFERENCES

Foth, H. D. and B. G. Ellis (1997) *Soil Fertility*, ($2^{nd}$ ed.) Lewis Publishers, New York, N.Y.

Moffat, A. S. (1999) "Engineering plants cope with metals," *Science* 285:369-370.

Paton, T. R. (1978) *The formation of Soil Material*, George Allen and Unwin, Boston, Mass.

Stanitski, C. L., L. P. Eubanks, C. H. Middlecamp, and W. J. Stratton (2000), *Chemistry in Context*, ($3^{rd}$ ed.), McGraw Hill, Boston.

Tan, K. H. (1998) *Principles of Soil Chemistry*, ($3^{rd}$ ed.), Marcel Decker, Inc., New York, N.Y.

Whittaker, C. W., F. O. Lundstrom, and S. B. Hendricks (1933) "Reactions between Urea and Gypsum," *Industrial and Engineering Chemistry* 25:1280-1282.

Wright, R. (1999) "Milestone means worry as planet hits 6 billion," Tampa Tribune, 18 July, World population hits 6 billion, Tampa Tribune, 12 October.

We claim:

1. A slow-release fertilizer comprising:
   a mixture comprising monocalcium phosphate, dicalcium phosphate, gypsum, and magnesium sulfate;
   dolomitic phosphatic clay slime comprising micro and trace essential elements;
   urea; and
   potassium chloride; and
   an additive;
   wherein the mixture is prepared by mixing a phosphate ore with sulfuric acid and water, and wherein the phosphate ore of the mixture is a dolomitic phosphate ore;
   wherein the dolomitic phosphate ore comprises about 2% MgO; and
   wherein the additive is phosphogypsum.

2. The fertilizer according to claim 1, wherein the micro essential elements are Fe and Zn.

3. The fertilizer according to claim 2, wherein the dolomitic phosphatic clay slime comprises at least about 0.05% Fe and at least about 0.02% Zn.

4. The fertilizer according to claim 2, wherein the dolomitic phosphatic clay slime comprises at least about 1% Fe and at least about 1% Zn.

5. The fertilizer according to claim 1, wherein the trace essential elements comprise at least one element selected from the group consisting of Cu, Mn, Se, B, Cr, Co, Sn, Ni, V, Si and Mo.

6. The fertilizer according to claim 1, wherein the dolomitic phosphatic clay slime comprises at least about 0.001% Cu, at least about 0.0002% Mn, at least about 0.0002% Se, at least about 0.0001% B, at least about 0.0001% Cr, at least about 0.0001% Co, or at least about 0.0001% Mo.

7. The fertilizer according to claim 1, wherein the dolomitic phosphatic clay slime comprises at least about 0.03% Mn, at least about 0.001% Se, at least about 0.01% B, at least about 0.01% Cr, at least about 0.01% Co, at least about 0.001% Ni, at least about 0.001% Sn, at least about 0.001% V, or at least about 0.01% Mo.

8. The fertilizer according to claim 1, wherein the dolomitic phosphatic clay slime comprises approximately 5-20% solids.

9. The fertilizer according to claim 8, wherein the dolomitic phosphatic clay slime comprises 11% solids.

10. The fertilizer according to claim 1, wherein the additive comprises about 2 wt % to about 5 wt % of the fertilizer.

11. A method for preparing a slow-release fertilizer comprising:
   a) preparing a first mixture by mixing a phosphate ore with sulfuric acid and water to form monocalcium phosphate, gypsum, magnesium sulfate, and residual phosphate ore;
   b) adding to the first mixture micro and trace essential elements and dolomitic phosphatic clay slime to yield a second mixture;
   c) heating the second mixture to yield a third mixture comprising dicalcium phosphate and residual phosphoric acid;
   d) adding phosphate to the third mixture to neutralize the residual phosphoric acid to yield a fourth mixture;
   e) adding urea and potassium chloride to the fourth mixture to form a fertilizer mixture;
   f) drying the fertilizer mixture; and
   g) incorporating an additive selected from the group consisting of phosphogypsum, silica sand, natural gypsum, clay, coal dust, and a combination of any of the foregoing into the dried fertilizer mixture.

12. The method according to claim 11, comprising the additional step of heating the first mixture.

13. The method according to claim 12, wherein the phosphate ore is dolomitic phosphate ore.

14. The method according to claim 13, wherein the dolomitic phosphate ore comprises at least about 0.5% MgO.

15. The method according to claim 13, wherein the dolomitic phosphate ore comprises about 2% MgO.

16. The method according to claim 12, wherein the first mixture is heated at about 100° C.-130° C. for approximately 15-30 minutes.

17. The method according to claim 11, wherein the second mixture is heated for 30-90 minutes at about 70° C.-100° C.

18. The method according to claim 17, wherein the second mixture is heated to about 80° C.

19. The method according to claim 11, wherein the urea and the potassium chloride are added to yield a fertilizer mixture comprising 8-15% urea and 2-12% potassium chloride.

20. The method according to claim 11, wherein the fertilizer mixture is dried by heating the fertilizer mixture to between 100° C.-120° C.

21. The method according to claim 15, wherein the additive is phosphogypsum.

* * * * *